(12) United States Patent
Gendron et al.

(10) Patent No.: US 8,204,715 B1
(45) Date of Patent: Jun. 19, 2012

(54) SYSTEM AND METHOD FOR DETERMINING JOINT MOMENT AND TRACK ESTIMATION PERFORMANCE BOUNDS FROM SPARSE CONFIGURATIONS OF TOTAL-FIELD MAGNETOMETERS

(75) Inventors: Paul J. Gendron, San Diego, CA (US); Mihajlo Tomic, San Diego, CA (US); David Edelblute, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 256 days.

(21) Appl. No.: 12/731,920

(22) Filed: Mar. 25, 2010

(51) Int. Cl.
*G06F 15/00* (2006.01)
(52) U.S. Cl. ........................................................ 702/181
(58) Field of Classification Search .................. 702/181, 702/189; 704/214, 223; 324/303
See application file for complete search history.

(56) References Cited

U.S. PATENT DOCUMENTS

| | | | |
|---|---|---|---|
| 5,239,474 A | 8/1993 | Eaton, Jr. et al. | |
| 6,675,123 B1 | 1/2004 | Edelstein | |
| 7,921,695 B2 * | 4/2011 | Larocque | 73/61.44 |
| 2002/0198704 A1 * | 12/2002 | Rajan et al. | 704/214 |

* cited by examiner

*Primary Examiner* — Bryan Bui
(74) *Attorney, Agent, or Firm* — Ryan J. Friedl; Kyle Eppele

(57) ABSTRACT

A method allows for determining the quality of a vessel's moment estimate and track information derived from a suite of sensors measuring the local magnitude of the magnetic field. A Bayesian treatment, employing a Markov Chain Monte Carlo approach with Gibbs sampling is applied with reduced magnetic noise spatio-temporal correlation models and implied whitening procedures. Vessel moment parameters are handled with a Gaussian prior leading to conditional densities that are Gaussian and posterior marginal densities that are mixture-Gaussian. Other conditional quantile functions for track parameters are computed with a grid procedure. From these, the Markov chain is determined and the resulting joint density of all variates is constructed. The method allows for determining posterior marginal densities and dependencies associated with magnetic moment and track parameters. The method may be stored in a storage device in a sensor and may be executed by a processor within the sensor.

20 Claims, 11 Drawing Sheets

SYSTEM AND METHOD FOR DETERMINING JOINT MOMENT AND TRACK ESTIMATION PERFORMANCE BOUNDS FROM SPARSE CONFIGURATIONS OF TOTAL-FIELD MAGNETOMETERS

FEDERALLY SPONSORED RESEARCH AND DEVELOPMENT

The System and Method for Determining Joint Moment and Track Estimation Performance Bounds from Sparse Configurations of Total-Field Magnetometers is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email sscpac_T2@navy.mil. Reference Navy Case No. 99988.

BACKGROUND

Measurements of the magnetic field, either the vector field or its magnitude, taken at the sea floor can be used to make inferences regarding the presence and motion of objects that impart a magnetic field disturbance. Systems derived from such sensors can be broadly termed magnetic anomaly detection or magnetic tracking systems. From a suitable suite of such sensors the magnetic moment and a set of parameters characterizing its track can be used to predict the object's motion through the volume, yielding valuable information. For this reason it is useful to know the minimum attainable variance that a given suite of sensors can provide regarding a given vessel's magnetic signature and track. This type of analysis can further serve to illuminate the minimum required spacing of sensors in a domain and the signal fusion and processing functions necessary to meet a certain accuracy of track. Related issues associated with for instance, the communication demands on distributed and networked configurations of such sensors can only be adequately addressed with an accurate assessment of the vessel track variance as a function of the number of sensors and their spatial configuration.

If the attainable vessel track accuracy is not adequately understood, systems could be designed from excessively sparse configurations leading to grossly inadequate track information. This could imply excessive false alarm rates and increased communication network demand for a distributed sensor field. Poor track information can additionally render the system unusable to secondary and more valuable surveillance assets. Excessively pessimistic assessments of track accuracy would lead to more deployed sensors than necessary resulting in a greater cost and time of deployment and an unfounded prohibition against the use of such sensors.

Measurements of the local magnitude of the magnetic field, so called "total-field" measurements allow for the exploration of a number of distributed sensor surveillance system designs and sensor signal processing issues. Total field magnetic sensors are relatively insensitive to sensor motion and therefore offer some advantages in rapidly deployed systems.

There is a current need for tools and methods that determine the amount of information that a sparse suites of magnetic sensors can provide regarding transiting vessel size and track in realistic undersea noise environments, as well as signal processing algorithms that operate in a hierarchical framework for data fusion across sparse sensor suites so that necessary information sharing is accomplished to meet a requisite track and moment accuracy with a minimal intersensor communication cost as envisioned in distributed networked undersea sensor concepts for ASW.

DETAILED DESCRIPTION OF SOME EMBODIMENTS

Figure 1:
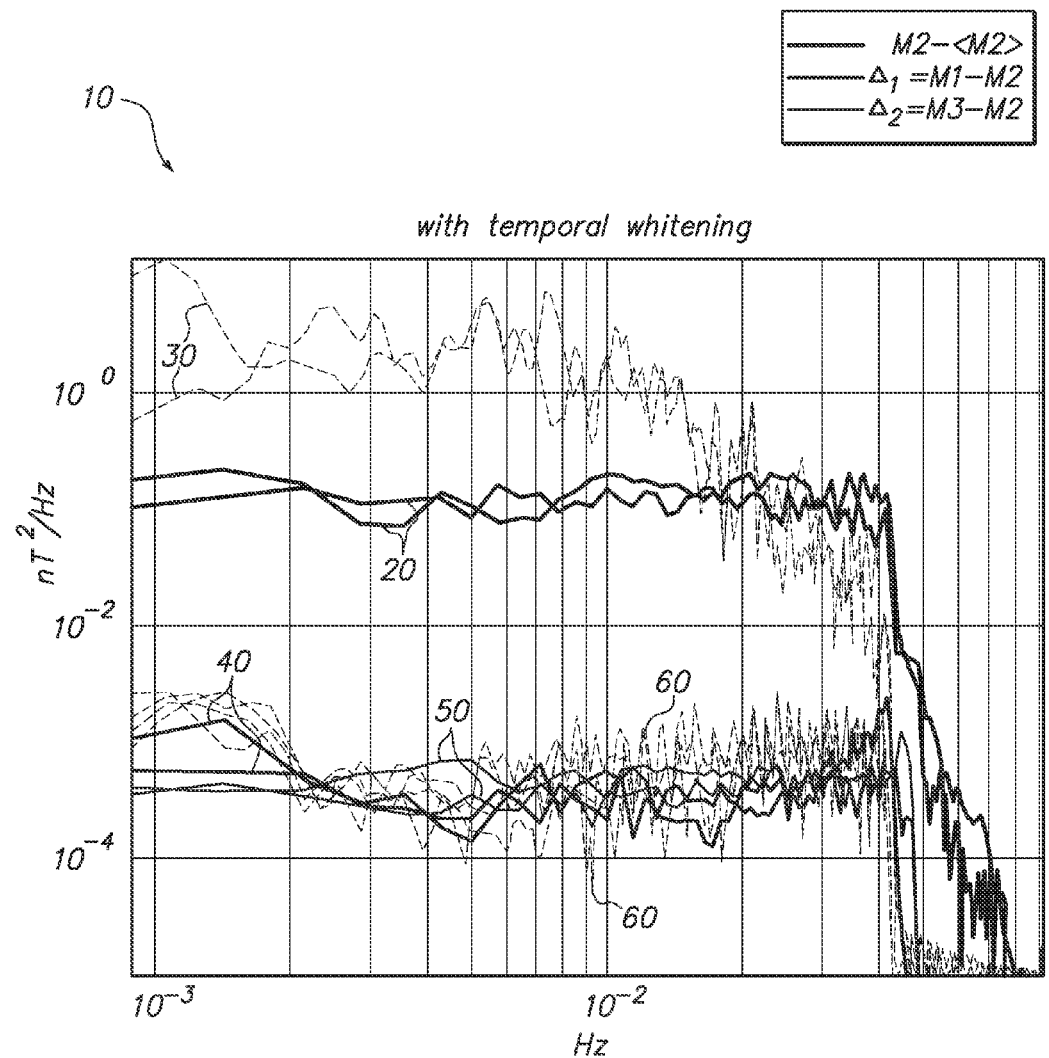
FIG. 1 shows a diagram of a graph illustrating passband ambient geomagnetic noise spectra and covariance modeling with a near linear three element sensor array, with the center element designated M2 and the two other elements being a gradiometer series with respect to M2, in accordance with the System and Method for Determining Joint Moment and Track Estimation Performance Bounds from Sparse Configurations of Total-Field Magnetometers.

An understanding of the necessary inter-sensor spacing to attain a certain vessel track accuracy and quality of estimate of vessel magnetic moment is essential for the practical use of sparse distributed sensor configurations. The distributed signal processing and fusion requirements, as well as necessary inter-sensor communication demands are fundamentally driven by these issues. Conversely, it is of interest to determine the attainable accuracy of track and vessel's moment estimates from a given configuration of sensors.

The embodiments of the methods described herein allow for the determination of the quality of vessel moment estimates and track information derived from a suite of sensors that measure the local magnitude of the magnetic field. A Bayesian treatment, employing a Markov Chain Monte Carlo (MCMC) approach with Gibbs sampling is applied with reasonable yet reduced magnetic noise spatio-temporal correlation models and implied whitening procedures. Assumed here is that a priori vessel moment parameters are well handled with a Gaussian prior. This leads to conditional densities that are also Gaussian and posterior marginal densities that are mixture Gaussian where the mixture density is associated with the marginal density of the track parameters. Individual conditional track parameter densities each feed the Gibbs sampler. In order to sample from these we construct the necessary conditional quantile functions from a grid sampling of the density and employ an inverse cumulative density function on a uniform variate. The quantile function is constructed with spline interpolation. From these, the Markov chain is determined and the resulting joint density of all variates is constructed empirically as a large posterior sample set that captures all track and moment dependencies.

The method allows for the determination of all posterior marginal densities and the dependencies associated with magnetic moment and track parameters. It is shown that, for typical surface vessels, estimates of ship magnetic moment can be quite accurate in the absence of track ambiguity at significant ranges even when sensor numbers are quite small and placement is not optimal. For the case of less certain track information, joint track and moment estimation is necessary and the MCMC approach is required. It is shown that moment estimation variance can be kept reasonably low only at relatively close ranges. The embodiments of the methods described herein may be used in determining sensor configurations that are optimal with reasonable prior information on track and moment parameters and to provide guidance on system concepts for fusion with other sensor modalities such as acoustic and electric field sensors.

The approach may be used to quantifying the surplus variance that is incurred when track parameters must be jointly estimated. To illuminate the issue, consider the decomposition of variance of magnetic moment given some data set acquired from a sensor suite and a set of statistical parameters that characterize the noise field; $\Sigma$, $$\text{var}[\overline{m}|\text{data},\Sigma] = E_{\theta|data,\Sigma}\text{var}[\overline{m}|\text{data},\theta,\Sigma] + \text{var}_{\theta|data,\Sigma}E[\overline{m}|\text{data},\theta,\Sigma]. \quad (1)$$

The first term is the error variance when track parameters are known, averaged over the posterior distribution of track parameters, $\theta$. If each variance in the first term is small the average, $E[.]$ will be small. The second term is the variance over track parameters of the expected value of moment (with track parameters known) and captures the added error in moment associated with the estimating track parameters. This term increases as the variance in estimating track parameters increases. The estimation of moment is degraded (on average) by an amount $\text{var}_{\theta|data,\Sigma}E[\overline{m}|\text{data},\theta,\Sigma]$ due to the need to estimate the track. Determining the size of the second error term relative to the first is helpful to understanding how track estimation impacts moment estimation and illuminates the practical problems of sensor sparsity and the associated signal fusion requirements for joint moment and track estimation in distributed sensor systems. Accurately predicting the size of this track error induced term is of importance in accurately characterizing the information content that a sensor suite offers and informs system designers in determining inter-sensor spacing. The embodiments of the methods described herein can be used to help quantify the size of these two errors.

Modeling and Observations of Geomagnetic Total Field Noise

Consider a sparse total-field magnetic sensor configuration from which geomagnetic noise measurements are taken. First define the multivariate Gaussian density associated with $X \in \mathscr{R}^N$ as $$\mathcal{N}_x(\mu, C) = \frac{1}{(2\pi)^{N/2}|C|^{1/2}}\exp((x-\mu)'C^{-1}(x-\mu)) \quad (2)$$

To simplify the modeling of the noise process, it is useful to define one of the sensors as a "reference" sensor. The unconditional density of this arbitrary reference sensor time series $b_{ref}$ at location $s_{ref}$ is modeled as $$H_0: b_{ref}|b_0, C_{ref} \sim \mathcal{N}_{b_{ref}}(b_0 1, C_{ref}),$$

$$:b_{ref}^{bp}|C_{ref} \sim \mathcal{N}_{b_{ref}}(0, FC_{ref}F') \quad (4)$$

where $b_0$ is the dc component of the magnitude of the Earth's magnetic field time series of total field measurements at location $s_{ref}$ and $H_0$ implies that no transient signals are present. $C_{ref}$ captures the temporal correlation structure that is synonymous with the power spectral density of the total Earth's field, while F is a bandpass filter operator associated with the signal band of interest. In some embodiments, F has a passband of 0.4 mHz to 40 mHz.

Model the conditional density of the magnitude of the ambient magnetic noise field at the $k^{th}$ sensor given the reference sensor (the reference sensor will be called the $K^{th}$ sensor) in the signal band of interest as Gaussian according to:

$$H_0: b_k^{bp}|b_{ref}, C_k \sim \mathcal{N}_{b_k^{bp}}(b_{ref}^{bp}, FC_kF'), \quad (4)$$

where $b_k$ is the $k^{th}$ time series of total field measurements at location $s_k$ and $H_0$ implies that no transient signals are present. The diagonalizing/whitening filters associated with $FC_kF'$ and $FC_{ref}F'$ are computed by Levinson from covariance functions derived from noise-only sampled data sets. Define these filters as $W_k$ and $W_{ref}$ respectively. Then, summarize the total field geomagnetic noise model at the K element sensor suite according to $$H_0: \Delta_k|b_{ref}, C_k \sim \mathcal{N}_\delta(0, I\sigma_k^2) \quad \Delta_k = W_k(b_k - b_{ref}),$$
$$C_k^{-1} = W_kW_k'\sigma_k^{-2}$$

$$\tilde{b}_{ref}|C_{ref} \sim \mathcal{N}_b(0, I\sigma_{ref}^2) \quad \tilde{b}_{ref} = W_{ref}b_{ref}, C_{ref}^{-}$$
$$1 = W_{ref}W'_{ref}\sigma_{ref}^{-2} \quad (5)$$

The ambient Earth's magnetic field strength at the K sensor locations $S_{ref}, S_k, k=1, \ldots K-1$, in the signal band associated with F is completely characterized by $\tilde{b}_{ref}, \Delta_k, W_{ref}, W_k$ and $\sigma_{ref}, \sigma_k$, with $k=1, \ldots K-1$.

This modeling scheme has been tested on underwater total field magnetic noise data sets. The geometry was that of a near linear array with 100 m inter-sensor spacing. The reference sensor is the middle sensor and the array angle is −44 degrees relative to Earth's North. FIG. 1 shows a graph 10 of the noise power spectral density both before and after this noise whitening procedure, using a three sensor array configuration. The output of the reference sensor is shown by lines 20, while lines 40 and 50 represent output from the other two sensors in the array. Unfiltered sensor data of the reference sensor is shown by lines 30, while unfiltered sensor data of the other sensors is shown by lines 60.

As shown in FIG. 1, the sharp drop-off at W=40 mHz is associated with the bandpass filter F and greatly attenuates the surface swell wave induced noise process. It is demonstrated that, while very little is gained from temporal whitening of the gradiometer time series, approximately 6 dB is gained from temporal whitening of the reference sensor, $b_{ref}$. At 10 mHz, the noise power spectral density is reduced nearly 6 dB relative to the raw bandpass filtered signal.

Model of Total Field Response from a Surface Vessel

Consider a target passing at a range such that the resulting perturbation in the magnetic field is modeled as a dipole. The measured field at the $k^{th}$ sensor, $b_k$ due to the vessel at location $r_t = r_{cpa} + v(t - t_{cpa})$ with dipole moment m[Am$^2$] is represented by:

$$B_{k,t}^{target} = \frac{\mu_0}{4\pi} \times \left[ \frac{3 r_t r_t' m}{\|r_t\|^5} - \frac{m}{\|r_t\|^3} \right] \quad [Tesla] \quad (6)$$

$$= G_{\theta,k,t} m$$

$$\theta = \{\phi, r_{cpa}, v\}$$

where $\phi$ is the heading angle associated with vessel velocity, v is the velocity magnitude (i.e. $v=v \cos \phi e_1 + v \sin \phi e_2$) and $r_{cpa}$ the magnitude of the range at the closest point of arrival to the reference sensor. The dipole Green's function, $G_{\theta,k,t}$ is the $R^{3 \times 3}$ map from vector dipole m to imparted magnetic field $B_k^{target}$ at the sensor. Let $\|B_{earth}\|$ represent the Earth magnetic field magnitude and $u_o$ a unit vector in its direction. Since the Earth's field is dominated by a spatio-temporal dc value $\|B_{earth}\|u_o$ that is much greater than the magnitude of the target field $\|B_k^{target}\|$, the measured field magnitude will be very well approximated by:

$$\|B_{k,t}\| = \|B_{earth,t}\| + u_0' G_{\theta,k,t} m$$

$$\theta = \{\phi, r_{cpa}, v\}. \quad (7)$$

Assume the time at the closest point of approach, $t_{cpa}$ is known and let $T_o$ be the extreme edge of a time window such that $\|B_{k,t_{cpa}-T_o/2}\| \leq \epsilon \max_t |B_{k,t}^{target}\|$ for $\epsilon$ close to machine precision. Define the total field measurement over the $T_o$ duration at the $k^{th}$ sensor as $b_k$ and the associated $WT_o \times 3$ dipole response functions $G_{\theta,k}$ as $$b_k = \begin{bmatrix} \|B_{k,t_{cpa}-T_o/2}\| \\ \|B_{k,t_{cpa}}\| \\ \|B_{k,t_{cpa}+T_o/2}\| \end{bmatrix} \quad G_\theta = \begin{bmatrix} u_o' G_{\theta,k,t_{cpa}-T_o/2} \\ \vdots \\ u_o' G_{\theta,k,t_{cpa}} \\ \vdots \\ u_o' G_{\theta,k,t_{cpa}+T_o/2} \end{bmatrix} \quad (8)$$

With this, express the measurements from the entire K element sensor suite as $b=[b_{ref}, \Delta_1, \ldots \Delta_{K-1}]$, a stacked array of measurements from a reference sensor and the remaining gradiometers relative to it. The signal plus noise model $H_1$ is then;

$$H_1 : b|t_{cpa}, \theta, m \sim \mathcal{N}_b(UG_\theta m, \Sigma) \quad (9)$$

where U is the invertible spatial difference operator retaining the reference sensor specified in equation 5.

Estimation of Vessel Moment with Track Parameters Known Exactly

In this section an analysis of the first term of equation 1 is provided and will be used as a baseline so that the growth in moment variance when track is not known and must be estimated can be assessed. With track parameters known exactly, the Green's function is specified and the measured total field is a linear function of the target magnetic moment as summarized in equation 9. The posterior density of moment m given the ambient noise field covariance model of equation 5, the track parameters, θ and a set of total field measurements b, is Gaussian. This is summarized as follows, assuming that the prior information on moment is summarized with $$m|m_o, \Lambda \sim \mathcal{N}_m(m_o, \Lambda). \quad (10)$$

Along with equation 9, this leads to $m|b, \theta, m_o, \Lambda \sim \mathcal{N}_m(\hat{m}, \Gamma_{\theta,\Sigma})$.

$$\hat{m} = (I - \Lambda G_\theta' (G_\theta \Lambda G_\theta' + \Sigma)^{-1} G_\theta) m_o + \Lambda G_\theta' (G_\theta \Lambda G_\theta' + \Sigma)^{-1} b$$

$$\Gamma_{\theta,\Sigma} = \text{var}[\hat{m}|b,\theta,\Sigma] = \Lambda - \Lambda G_\theta' (G_\theta \Lambda G_\theta' + \Sigma)^{-1} G_\theta \Lambda. \quad (11)$$

Estimation of the moment is therefore a simple linear function of the sensor measurements with the linear map fully specified by the Green's function and noise covariance. The variance of the moment magnitude, var[|m|$|b,\theta,\Sigma$], can be derived using the first and second moments of the Gaussian posterior density of m, the vector moment. To construct this moment magnitude estimate and its variance first note that $|m|^2$ is a Gaussian quadratic form, $$|m|^2 = m'm \quad (12)$$

implying that $$E[m'm|b,\theta,\Sigma] = \text{tr}[\Gamma_\theta] + 2 m_o' m_o.$$

$$\text{var}[m'm|b,\theta,\Sigma] = 2\text{tr}[\Lambda_\theta \Lambda_\theta] + 4 m_o' \Lambda_\theta m_o. \quad (13)$$

A good approximation to var[|m|$|b,\theta,\Sigma$] can be made using $$\text{var}[\sqrt{x}] \approx |dg/dx|_{x=E[x]}^2 \text{var}[x],$$

where $$g = \sqrt{x}$$

and $$x = |m|^2.$$

The result is $$\text{var}[|m| \mid b, \theta, \Sigma] \approx \frac{\text{var}[m'm \mid b, \theta, \Sigma]}{4 tr[\Gamma_\theta] + m_o' m_o} \quad (14)$$

providing a good summary measure of the accuracy of the moment estimate obtained when track parameters are known exactly. This approximation has been shown by Monte Carlo methods to be quite accurate over a full 360 degrees of heading and all ranges and speeds relevant to underwater surveillance. Ambient magnetic noise data collected from a near linear three element array of total field He3 sensors placed on the seafloor were used to determine the quality of estimation possible when track is known exactly.

Figure 2:
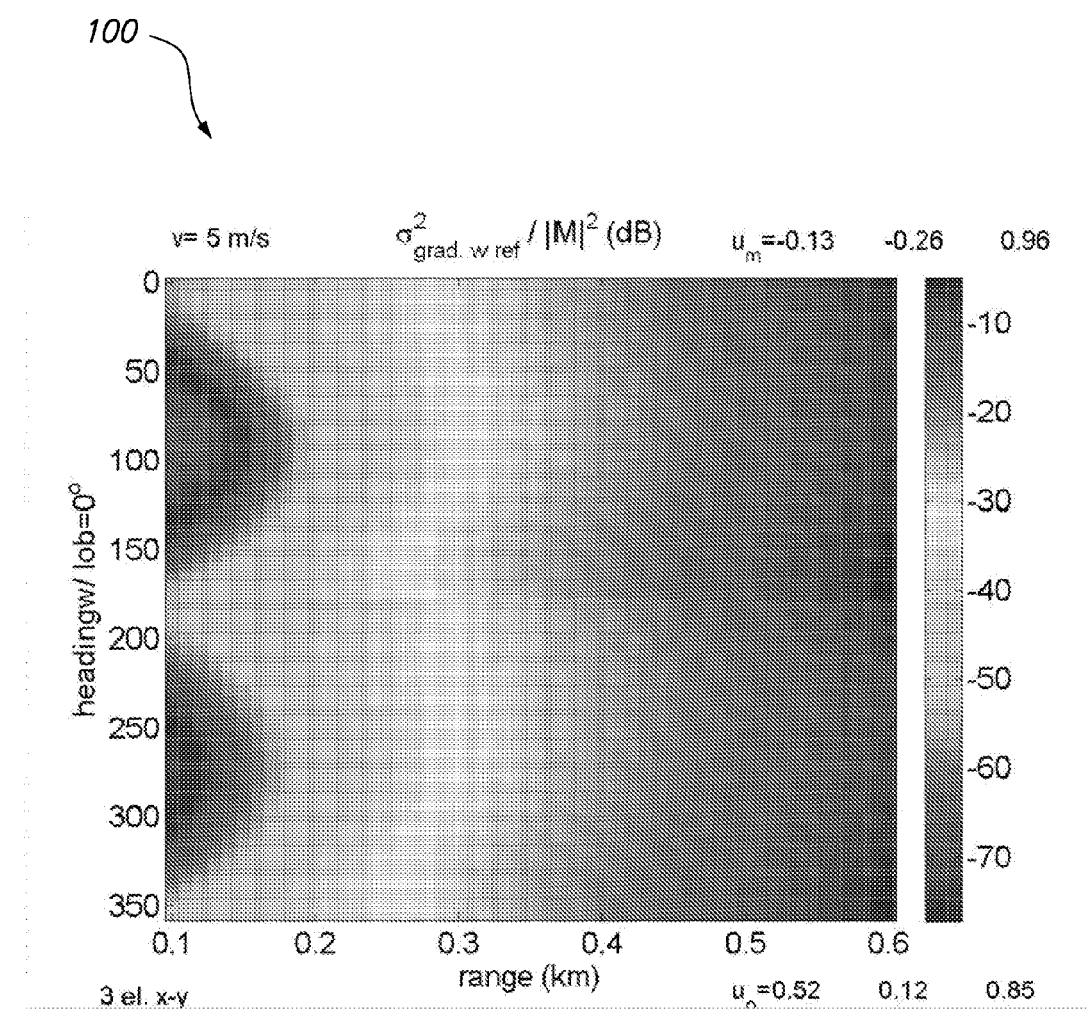
FIG. 2 shows a graph illustrating the marginal density of vessel magnetic magnitude as a function of vessel range and heading with the line of bearing of the array at zero degrees when vessel track parameters are known exactly, in accordance with the System and Method for Determining Joint Moment and Track Estimation Performance Bounds from Sparse Configurations of Total-Field Magnetometers.

FIG. 2 shows a graph 100 illustrating the marginal density of vessel magnetic magnitude as a function of vessel range and heading with the line of bearing of the array at zero degrees when vessel track parameters are known exactly, in accordance with the System and Method for Determining Joint Moment and Track Estimation Performance Bounds from Sparse Configurations of Total-Field Magnetometers. Equation 13 and 14 were implemented, resulting in graph 100 as shown in FIG. 2. It is assumed that the permanent moment magnitude component dominates the induced moment magnitude and therefore the induced moment is ignored. While the results would be subtly different with the induced moment included the methodology would not change, provided only that the prior density on the induced moment size is well modeled as a Gaussian. The chosen ship model was that of an R/V Sproul-like vessel, with a magnetic moment of approximately $1.5 \times 10^5$ Am$^2$. FIG. 2 displays the variance var[|m|||b, $t_{cpa}, \theta, \Sigma$] relative to vessel's true total moment.

As a result of the methods disclosed herein, the moment of a vessel can be estimated with a relative error less than $-10$ dB at 600 m when track parameters are known exactly. Variation in moment estimation accuracy relative to heading is significant due to the nature of total field measurements where only the field in the direction of the dominating DC Earth's background field is measured. Thus, when the dipole anomaly field is perpendicular to the Earth's field at the sensor, the measured anomaly is relatively small, received SNRs are greatly reduced, and estimation performance degraded.

Quality of Vessel Moment Estimation with Track Parameters Jointly Estimated

Estimation of a ship's moment with track parameters unknown is a computationally more challenging problem with the necessity of determining the joint density of the moment and track parameters from the data and the model of the noise field. From the joint density of moment and track, the marginal density on moment can be constructed by integration. This joint density can be numerically approximated with an MCMC approach with each individual track parameter conditional density specified.

The conditional density of the three components of moment m, given all track parameters $\theta$, is Gaussian and computed via equation 11. In order to draw samples from each of the track parameters we sample eight as a function of these through the Green's function and construct quantile functions by which samples can be drawn. The resulting Gibbs sampling scheme is run with a burn-in of 1000 samples and every 50th sample is retained. The resulting marginal density of moment components is that of a mixture Gaussian with mixture taken over the track parameters, which fully specifies each of the component mean and covariance functions of the mixture. The conditional density of any of the three track parameters $\phi$, $r_{cpa}$, v given all other parameters and $t_{cpa}$ is specified by a numerical representation of its quantile function from which samples can be drawn.

Figure 3:
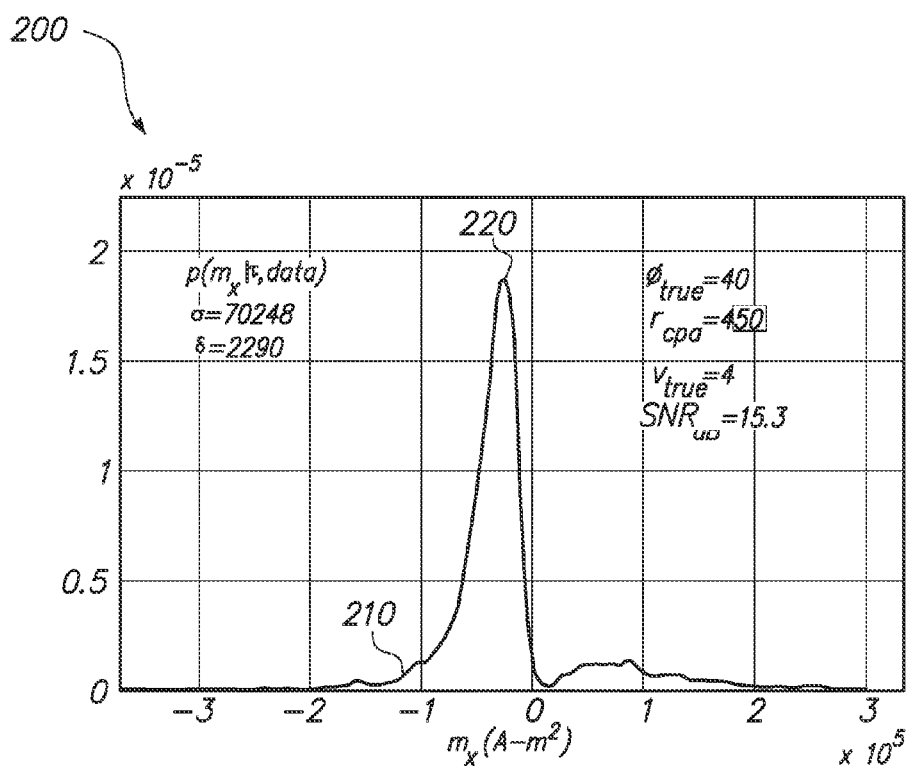
FIG. 3 shows a graph illustrating the marginal density of the cross track component of a vessel magnetic moment at a range of 450 m and a heading of forty degrees, in accordance with the System and Method for Determining Joint Moment and Track Estimation Performance Bounds from Sparse Configurations of Total-Field Magnetometers.
Figure 4:
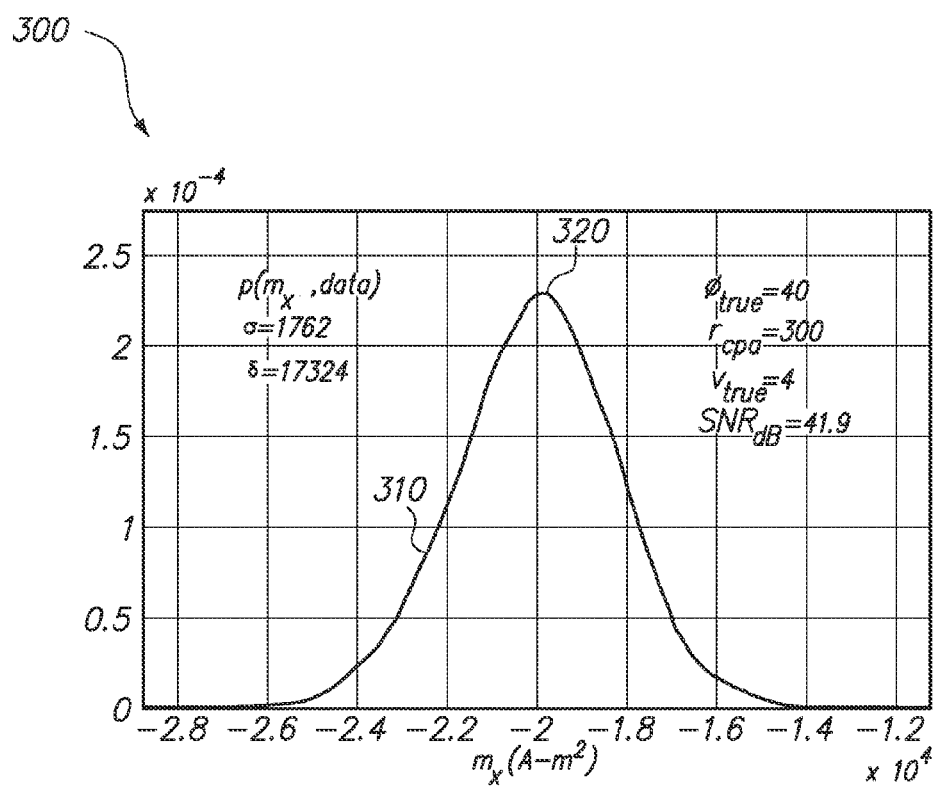
FIG. 4 shows a graph illustrating the marginal density of the cross track component of a vessel magnetic moment at a range of 300 m and a heading of forty degrees, in accordance with the System and Method for Determining Joint Moment and Track Estimation Performance Bounds from Sparse Configurations of Total-Field Magnetometers.

Referring to FIGS. 3 and 4, FIG. 3 shows a graph 200 illustrating the marginal density of the cross track component of a vessel magnetic moment at a range of 450 m and a heading of forty degrees, while FIG. 4 shows a graph 300 illustrating the marginal density of the cross track component of a vessel magnetic moment at a range of 300 m and a heading of forty degrees, in accordance with the System and Method for Determining Joint Moment and Track Estimation Performance Bounds from Sparse Configurations of Total-Field Magnetometers.

FIGS. 3 and 4 summarize the performance of cross track vessel moment estimation when track parameters are unknown with the exception of the time at the closest point of approach, $t_{cpa}$. FIGS. 3 and 4 display posterior moment probability density functions, represented by line 210 with a maximum 220 (FIG. 3) and line 310 with a maximum 320 (FIG. 4), for the cross track component of a vessel's moment when track parameters must be jointly estimated. The additional variance at 450 m range (FIG. 3) compared to that at 300 m range (FIG. 4) is stark. At 450 m, a bimodal distribution is evident. This ambiguity is clearly exposed in the posterior joint distribution of these horizontal components of moment.

Figure 5:
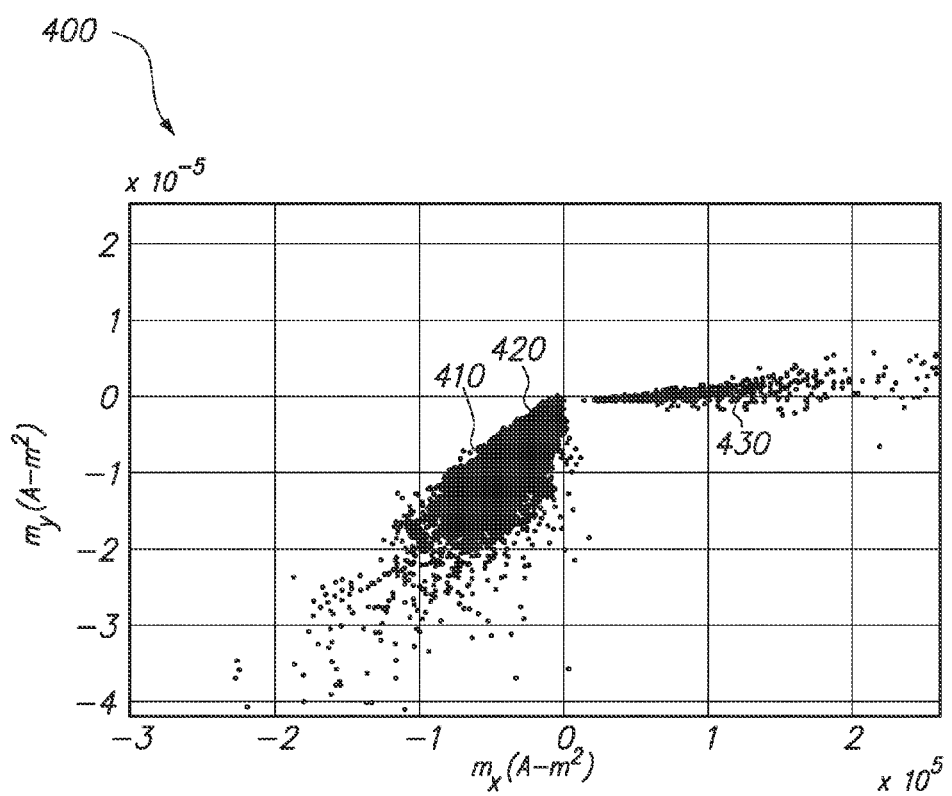
FIG. 5 shows a scatter plot illustration of the marginal density of the along track and cross track components of a vessel's magnetic moment at a range of 450 m and a heading of forty degrees, in accordance with the System and Method for Determining Joint Moment and Track Estimation Performance Bounds from Sparse Configurations of Total-Field Magnetometers.

FIG. 5 shows a scatter plot 400 of the marginal density of the along track and cross track components of a vessel's magnetic moment at a range of 450 m and a heading of forty degrees, in accordance with the System and Method for Determining Joint Moment and Track Estimation Performance Bounds from Sparse Configurations of Total-Field Magnetometers. Plot 400 includes two data regions, 410 and 430. The true vessel moment is displayed as data point 420. The excessive spread of the distribution, dominates the true moment. Reliable estimation of moment and track parameters at 450 m with such a sparse sensor suite is problematic in this geomagnetic noise environment, as shown by the two data regions 410 and 430.

Figure 6:
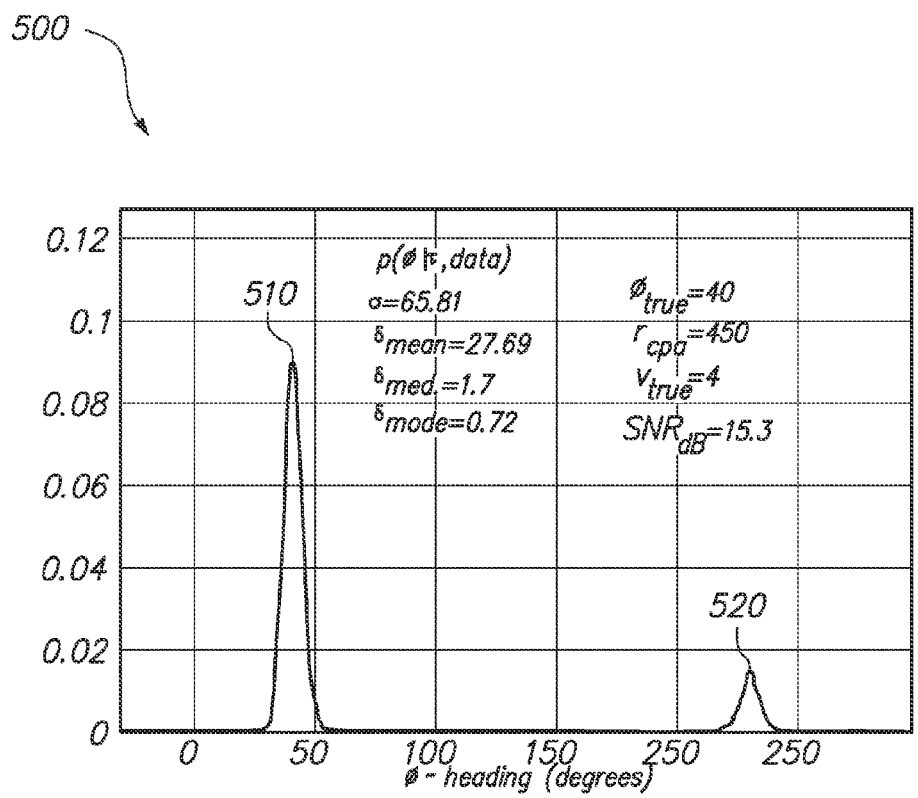
FIG. 6 shows a graph illustrating the posterior density of vessel heading given only three sensor measured data, track time at closest point of approach, and noise statistics, in accordance with the System and Method for Determining Joint Moment and Track Estimation Performance Bounds from Sparse Configurations of Total-Field Magnetometers.

FIG. 6 shows a graph 500 illustrating the posterior density of vessel heading given only three sensor measured data, track time at closest point of approach, and noise statistics, in accordance with the System and Method for Determining Joint Moment and Track Estimation Performance Bounds from Sparse Configurations of Total-Field Magnetometers. As shown, data from the sensors produces output having two peaks, 510 and 520, which occur at a heading of roughly 40 degrees and 230 degrees, respectively.

Figure 7:
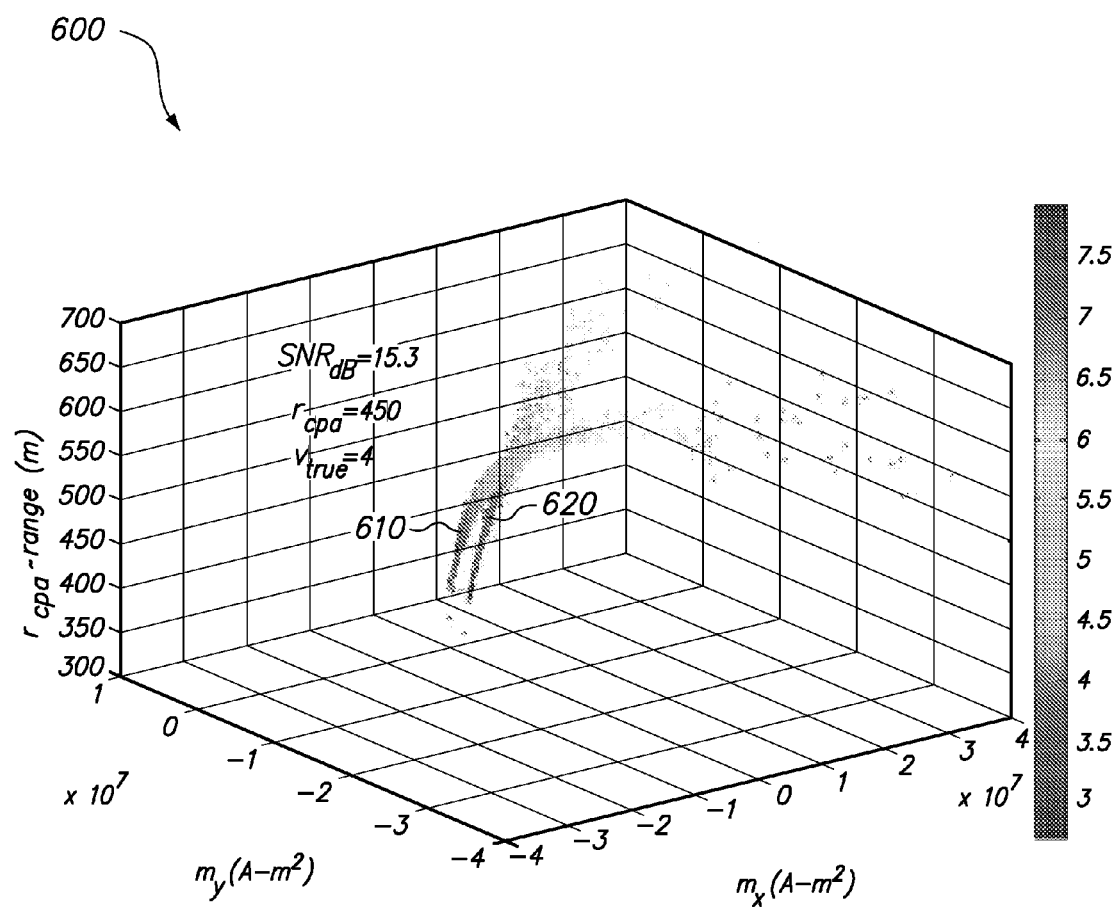
FIG. 7 shows a graph illustrating the posterior joint density of vessel horizontal moments, range at closest point of approach, and vessel speed, with noise statistics, in accordance with the System and Method for Determining Joint Moment and Track Estimation Performance Bounds from Sparse Configurations of Total-Field Magnetometers.

FIG. 7 presents the joint density of horizontal moment components, $m_x$, $m_y$, along with $r_{cpa}$ and speed, v. Speed is mapped to a color scale of approximately 3 m/s to 8 m/s. The two gradiometers exhibit an average signal-to-noise ratio (SNR) of 15 dB at this range. The strong posterior correlation between range and speed is quantified. The two modes correspond to the 44 degree heading and the 256 degree heading. This ambiguity in angle of arrival that exists when the reference sensor SNR is below about 0 dB, as it is in FIG. 7.

Figure 8:
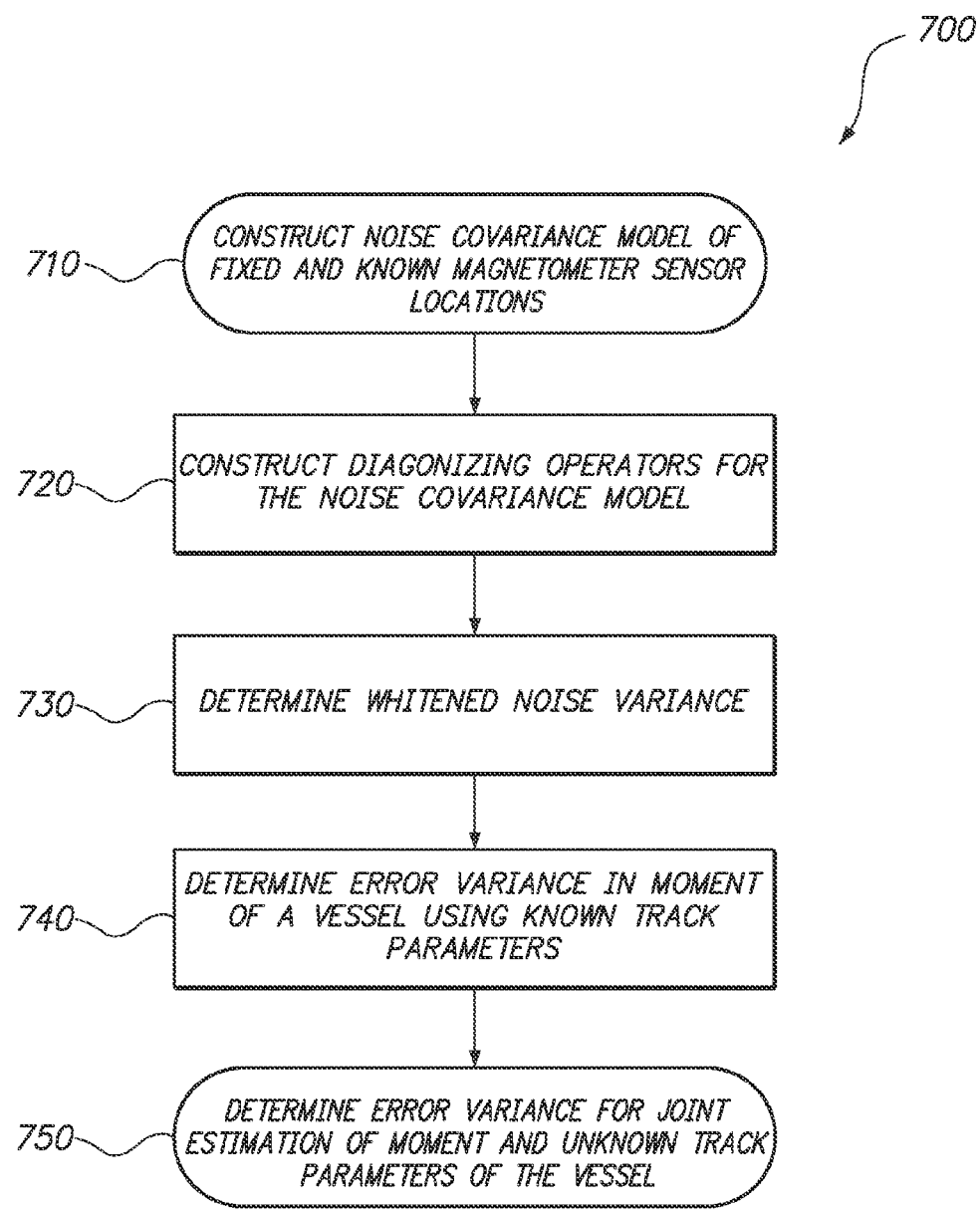
FIG. 8 shows a flowchart of an embodiment of a method in accordance with the System and Method for Determining Joint Moment and Track Estimation Performance Bounds from Sparse Configurations of Total-Field Magnetometers.
Figure 9:
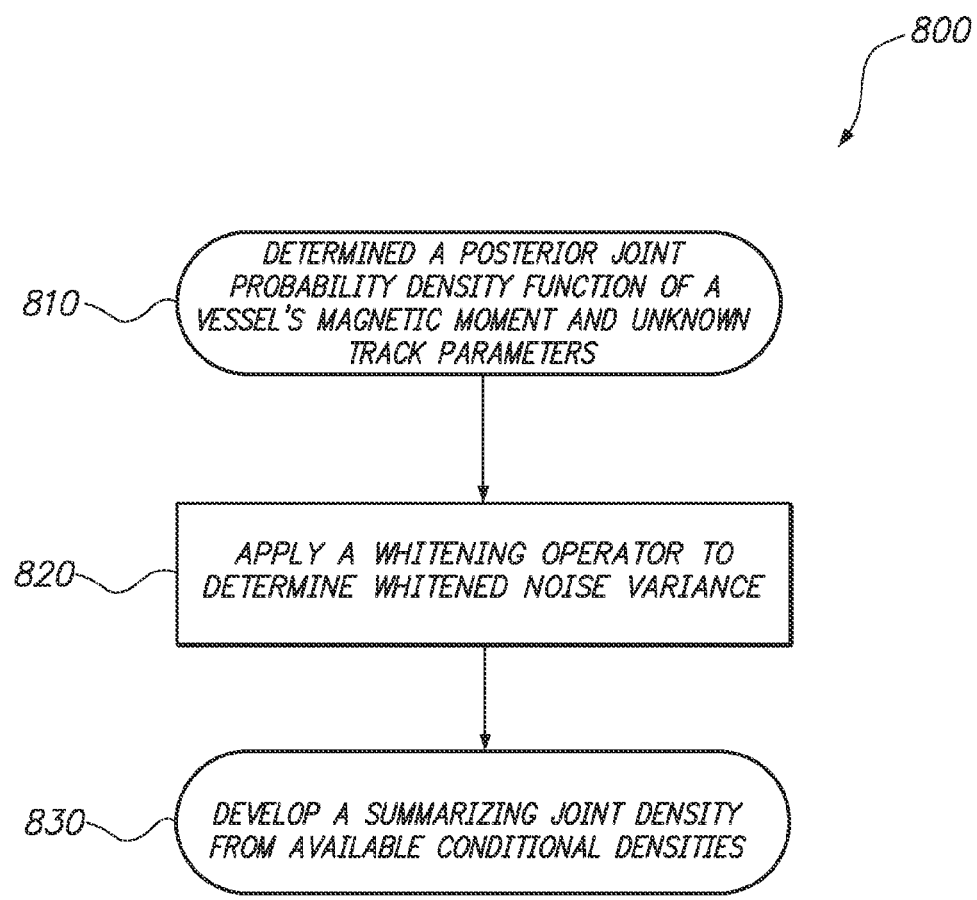
FIG. 9 shows a flowchart of another embodiment of a method in accordance with the System and Method for Determining Joint Moment and Track Estimation Performance Bounds from Sparse Configurations of Total-Field Magnetometers.
Figure 10:
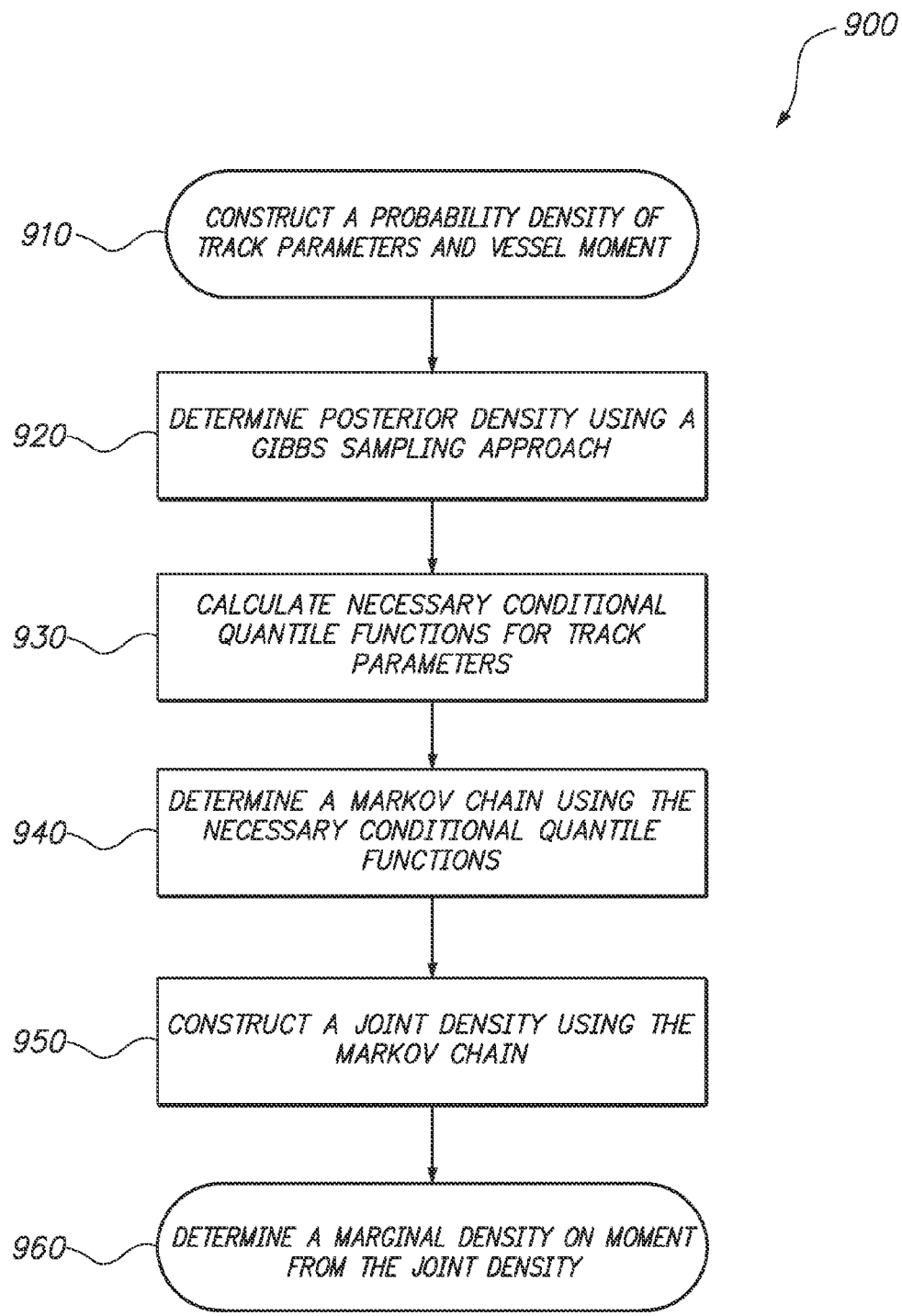
FIG. 10 shows a flowchart of another embodiment of a method in accordance with the System and Method for Determining Joint Moment and Track Estimation Performance Bounds from Sparse Configurations of Total-Field Magnetometers.

FIGS. 8-10 show flowcharts of embodiments of methods 700, 800, and 900, respectively, in accordance with the System and Method for Determining Joint Moment and Track Estimation Performance Bounds from Sparse Configurations of Total-Field Magnetometers.

Referring to FIG. 8, method 700 may begin at step 710, which involves constructing, given knowledge of the Earth's magnetic field vector at a DC frequency, a noise covariance model of fixed and known magnetometer sensor locations. In some embodiments, step 710 involves using coupled hydrodynamic and electromagnetic models that are configured to produce modeled predictions of the geomagnetic noise covariance. Step 720 may then involve constructing diagonalizing operators for the noise covariance model. Method 700 may continue to step 730, which involves determining whitened noise variance. Step 740 then involves determining an error variance in moment of a vessel having a given range and speed, using known track parameters. Method 700 may then proceed to step 750.

Step 750 involves determining an error variance for joint estimation of moment and unknown track parameters of the vessel. In some embodiments, step 750 includes the following steps: (a) drawing a sample of the vessel's moment given known track parameters and data and noise covariance, (b) drawing a sample from a range track parameter, (c) drawing a sample from a heading track parameter, (d) drawing a sample from a speed track parameter, (e) iteratively running steps (a)

through (d), and (f) decimating the resulting samples by a number P such that the resulting samples have no correlation.

Referring to FIG. 9, method 800 may begin at step 810, which involves determining a posterior joint probability density function of a vessel's magnetic moment and unknown track parameters from a set b of measured total field data at a sensor array and known magnetic field noise covariance $\Sigma$. In some embodiments, the set b of measured total field data is represented by the Gaussian density as $p(b|\phi,\bar{v} R, \Sigma) \alpha N_b (G_\theta \bar{m}, \Sigma)$, where $\theta$ represents the track parameters of range at closest point of approach, $R_{cpa}$, $\phi$ represents the vessel's heading, and $\bar{v}$ represents the vessel's velocity vector.

Method 800 may proceed to step 820, which involves applying a whitening operator $\Sigma^{-1/2}$ to determine whitened noise variance. In some embodiments, the whitening operator $\Sigma^{-1/2}$ is represented by the equation $\Sigma^{-1/2}=W \Lambda^{-1} W$, where $\Lambda$ represents a diagonal variance process and W represents a filter operator. The filter operators may comprise a cascade of unitary gradiometer operators and temporal forward prediction error filters and may be applied in the low-pass sub-band of 50 mHz.

Next, step 830 involves developing a summarizing joint density from available conditional densities. In some embodiments, the summarizing joint density is developed using a Markov Chain Monte Carlo (MCMC) approach. The MCMC approach may use a Gibbs sampling scheme with inverse cumulative density functions employed to sample from each of the conditional densities. The conditional densities may comprise a first conditional density associated with the three components of the vessel's magnetic moment given prior information on vessel magnetic moment, the noise model and statistics, and raw data at each sensor. The conditional densities may further comprise conditional densities associated with the vessel's range at closest point of approach, $R_{cpa}$, heading, $\phi$, and velocity vector, $\bar{v}$.

Referring to FIG. 10, method 900 may begin at step 910, which involves constructing a probability density of track parameters and vessel moment given only sensor data and reasonable prior information. Step 920 involves determining posterior density using a Gibbs sampling approach. Step 930 then involves calculating necessary conditional quantile functions for track parameters using a grid procedure and spline interpolation. Method 900 may then proceed to step 940, which involves determining a Markov chain using the calculated necessary conditional quantile functions. Step 950 may then involve constructing a joint density using the Markov chain. Step 960 may involve determining a marginal density on moment from the joint density.

The above-described methods, 700, 800, and 900, are helpful in determining typical ship track and moment estimation performance from total-field magnetic sensor suites in arbitrary sparse configurations. The approach is useful for informing sensor configurations as well as determining demands on sensor fusion algorithms such as number of sensor to fuse to attain a given accuracy of track and moment.

The methods employ reasonable magnetic noise spatiotemporal correlation models and implied whitening procedures throughout and observe about a 6 dB reduction in reference sensor noise variance when applied to at sea geomagnetic noise. At 100 m spacing in this environment, a 30 dB difference in noise power at the gradiometers relative to the raw total field measurement has been observed.

For the case of moment estimation under known track conditions, a closed form Gaussian solution results. For the case of no information or weak information regarding track, a full Bayesian treatment is required. The necessary computational demand is therefore significant, employing a Markov Chain Monte Carlo approach with Gibbs sampling described above. Necessary conditional quantile functions for track parameters are handled numerically via grid sampling or perhaps a Metropolis-Hastings based method. Ship moment parameters are handled with a Gaussian prior that leads to a conditional density that is also Gaussian and a posterior marginal density that is mixture Gaussian.

The methods allow for the exploration of posterior dependencies between track and moment parameters that can illuminate sensor fusion issues. These methods aid the understanding of required number of sensors as well as specifying the performance of less computationally demanding methods. As an example, the methods may be demonstrated with a sparse three element, near linear sensor configuration with 100 m inter-sensor spacing.

When track parameters are not known exactly estimation of moment is degraded and can be greater than an order of magnitude larger than the known track case, giving insight into the sensor fusion demands necessary for magnetic sensor only tracking. The methods described herein also illuminate the necessary information that other sensor modalities, such as electric field and acoustic sensors, would have to supply to reach a requisite track and moment accuracy.

The methods described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules.

Some or all of the steps of methods 700, 800, and 900 may be stored on a computer readable storage medium, wherein the steps are represented by computer readable programming code executable by a computer. The steps of methods 700, 800, and 900 may also be computer-implemented using a programmable device, such as a computer-based system. Methods 700, 800, and 900 may comprise computer-readable instructions that, when loaded into a computer-based system, are implemented in the computer-based system and cause the system to execute the steps of methods 700, 800, and/or 900. Methods 700, 800, and 900 may be implemented using various programming languages, such as "C" or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different steps of the above-described methods, implement the methods, and coordinate the functions of the methods.

Figure 11:
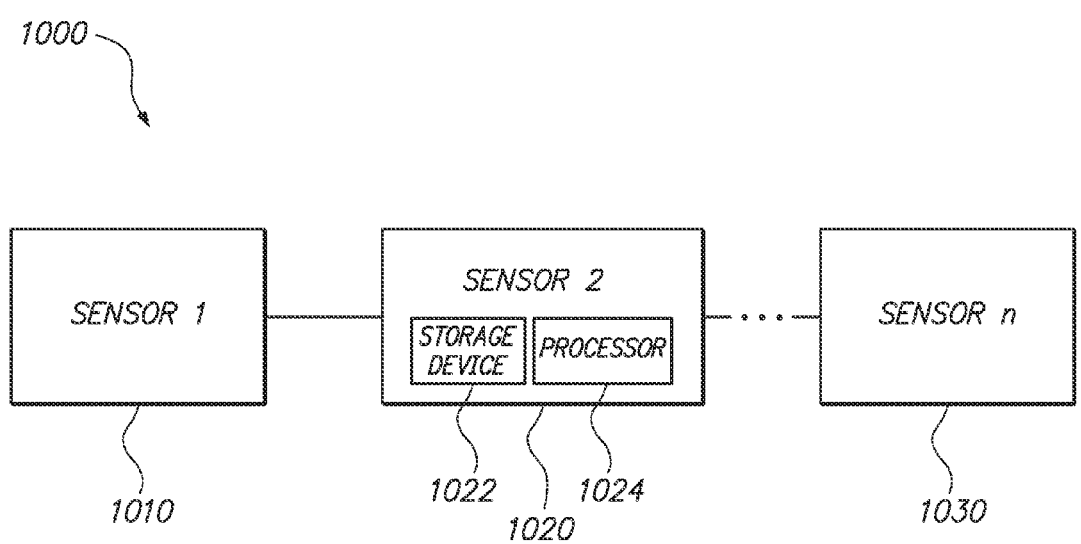
FIG. 11 shows a block diagram of an embodiment of a system for performing the methods in accordance with the System and Method for Determining Joint Moment and Track Estimation Performance Bounds from Sparse Configurations of Total-Field Magnetometers.

FIG. 11 shows a block diagram of an embodiment of a system for performing the methods in accordance with the System and Method for Determining Joint Moment and Track Estimation Performance Bounds from Sparse Configurations of Total-Field Magnetometers. The system shown in FIG. 11 may be used to implement any of methods 700, 800, or 900 discussed herein. The system includes sensor array 1000 having at least a first sensor 1010 and a second sensor 1020. In some embodiments, sensor array 1000 includes more sensors, up to an $n^{th}$ sensor 1030, where n is a positive integer greater than two.

At least one of the sensors of array 1000, shown here as sensor 1020, includes a storage device 1022 and processor 1024 therein. Storage device 1022 may have any of methods 700, 800, and/or 900 stored therein, with the methods being represented by computer readable programming code executable by processor 1024 to perform the respective method(s) 700, 800, and/or 900 stored therein.

Many modifications and variations of the System and Method for Determining Joint Moment and Track Estimation Performance Bounds from Sparse Configurations of Total-Field Magnetometers are possible in light of the above description. Within the scope of the appended claims, systems and methods may be practiced otherwise than as specifically described. Further, the scope of the claims is not limited to the implementations and embodiments disclosed herein, but extends to other implementations and embodiments as may be contemplated by those having ordinary skill in the art.

We claim:

1. A non-transitory computer readable storage medium having a method encoded thereon, the method represented by computer readable programming code executable by a computer to perform the method comprising the steps of:
constructing, given knowledge of the Earth's magnetic field vector at a DC frequency, a noise covariance model of fixed and known magnetometer sensor locations;
constructing diagonalizing operators for the noise covariance model;
determining whitened noise variance;
determining an error variance in moment of a vessel having a given range and speed, using known track parameters; and
determining an error variance for joint estimation of moment and unknown track parameters of the vessel.

2. The non-transitory computer readable storage medium of claim 1, wherein the step of constructing a noise covariance model comprises using coupled hydrodynamic and electromagnetic models that are configured to produce modeled predictions of the geomagnetic noise covariance.

3. The non-transitory computer readable storage medium of claim 1, wherein the step of determining an error variance for joint estimation includes the steps of:
(a) drawing a sample of the vessel's moment given known track parameters and data and noise covariance;
(b) drawing a sample from a range track parameter;
(c) drawing a sample from a heading track parameter;
(d) drawing a sample from a speed track parameter;
(e) iteratively running steps (a) through (d); and
(f) decimating the resulting samples by a number P such that the resulting samples have no correlation.

4. A non-transitory computer readable storage medium having a method encoded thereon, the method represented by computer readable programming code executable by a computer to perform the method comprising the steps of:
determining a posterior joint probability density function of a vessel's magnetic moment and unknown track parameters from a set b of measured total field data at a sensor array and known magnetic field noise covariance $\Sigma$;
applying a whitening operator $\Sigma^{-1/2}$ to determine whitened noise variance; and
developing a summarizing joint density from one or more available conditional densities.

5. The non-transitory computer readable storage medium of claim 4, wherein the set b of measured total field data is represented by the Gaussian density as $p(b|\phi, \bar{v}R, \Sigma) \alpha N_b (G_\theta \bar{m}, \Sigma)$, where $\theta$ represents the track parameters of range at closest point of approach, $R_{cpa}$, $\phi$ represents the vessel's heading, and $\bar{v}$ represents the vessel's velocity vector.

6. The non-transitory computer readable storage medium of claim 4, wherein the whitening operator $\Sigma^{-1/2}$ is represented by the equation $\Sigma^{-1/2} = W \Lambda^{-1} W$, where $\Lambda$ represents a diagonal variance process and W represents a filter operator.

7. The non-transitory computer readable storage medium of claim 6, wherein the filter operators comprise a cascade of unitary gradiometer operators and temporal forward prediction error filters.

8. The non-transitory computer readable storage medium of claim 7, wherein the filter operators are applied in the low-pass sub-band of 50 mHz.

9. The non-transitory computer readable storage medium of claim 4, wherein the summarizing joint density is developed using a Markov Chain Monte Carlo approach.

10. The non-transitory computer readable storage medium of claim 9, wherein the Markov Chain Monte Carlo approach uses a Gibbs sampling scheme with inverse cumulative density functions employed to sample from each of the one or more available conditional densities.

11. The non-transitory computer readable storage medium of claim 4, wherein the one or more available conditional densities comprise a first conditional density associated with the three components of the vessel's magnetic moment given prior information on vessel magnetic moment, the noise model and statistics, and raw data at each sensor.

12. The non-transitory computer readable storage medium of claim 11, wherein the one or more available conditional densities further comprise conditional densities associated with the vessel's range at closest point of approach, $R_{cpa}$, heading, $\phi$, and velocity vector, $\bar{v}$.

13. A computer-implementable method comprising the steps of:
constructing a probability density of track parameters and vessel moment given only sensor data and reasonable prior information;
determining posterior density using a Gibbs sampling approach;
calculating necessary conditional quantile functions for track parameters using a grid procedure and spline interpolation;
determining a Markov chain using the calculated necessary conditional quantile functions;
constructing a joint density using the Markov chain; and
determining a marginal density on moment from the joint density.

14. A system comprising:
a sensor array having at least two sensors, at least one of the sensors having a non-transitory storage device and processor therein, the non-transitory storage device having computer instructions stored therein, the computer instructions executable by the processor to perform the steps of:
determining a posterior joint probability density function of a vessel's magnetic moment and unknown track parameters from a set b of measured total field data at the sensor array and known magnetic field noise covariance $\Sigma$;

applying a whitening operator $\Sigma^{-1/2}$ to determine whitened noise variance; and developing a summarizing joint density from one or more available conditional densities.

15. The system of claim 14, wherein the set b of measured total field data is represented by the Gaussian density as $p(b|\phi, \bar{v} R, \Sigma) \propto N_b (G_\theta \bar{m}, \Sigma)$, where $\theta$ represents the track parameters of range at closest point of approach, $R_{cpa}$, $\phi$ represents the vessel's heading, and $\bar{v}$ represents the vessel's velocity vector.

16. The system of claim 14, wherein the whitening operator $\Sigma^{-1}$ is represented by the equation $\Sigma^{-1}=W\Lambda^{-1}W$, where $\Lambda$ represents a diagonal variance process and W represents a filter operator.

17. The system of claim 16, wherein the filter operators comprise a cascade of unitary gradiometer operators and temporal forward prediction error filters.

18. The system of claim 14, wherein the summarizing joint density is developed using a Markov Chain Monte Carlo approach using a Gibbs sampling scheme with inverse cumulative density functions employed to sample from each of the one or more available conditional densities.

19. The system of claim 14, wherein the one or more available conditional densities comprise a first conditional density associated with the three components of the vessel's magnetic moment given prior information on vessel magnetic moment, the noise model and statistics, and raw data at each sensor.

20. The system of claim 19, wherein the one or more available conditional densities further comprise conditional densities associated with the vessel's range at closest point of approach, $R_{cpa}$, heading, $\phi$, and velocity vector, $\bar{v}$.

* * * * *